United States Patent [19]
Johnson et al.

[11] Patent Number: 5,207,480
[45] Date of Patent: May 4, 1993

[54] SIX-WAY MANUAL SEAT ADJUSTMENT MECHANISM

[75] Inventors: Richard F. Johnson, Bloomfield Hills; Ashok K. Sahi, Farmington Hills, both of Mich.

[73] Assignee: Douglas & Lomason Company, Farmington Hills, Mich.

[21] Appl. No.: 809,928

[22] Filed: Dec. 18, 1991

[51] Int. Cl.[5] .............................................. A47C 1/02
[52] U.S. Cl. .................................. 297/344; 297/329; 297/346; 248/394
[58] Field of Search ............... 297/344, 346, 329, 325; 248/394, 608, 429

[56] References Cited
U.S. PATENT DOCUMENTS

| | | |
|---|---|---|
| 3,669,39? | 1992 | Robinson . |
| 3,692,271 | 9/1972 | Homier et al. . |
| 4,190,225 | 2/1980 | Bauer et al. . |
| 4,222,543 | 9/1980 | Gedig et al. . |
| 4,285,487 | 8/1981 | Kazaoka et al. . |
| 4,325,527 | 4/1982 | Berneking . |
| 4,482,120 | 11/1984 | Fudala . |
| 4,575,151 | 3/1986 | Edstrom ........................ 297/325 X |
| 4,616,875 | 10/1986 | McFalls et al. ................. 297/325 |
| 4,721,277 | 1/1988 | Hessler et al. . |
| 4,747,571 | 5/1988 | Hessler et al. . |
| 4,765,582 | 8/1988 | Babbs . |
| 4,770,386 | 9/1988 | Hessler et al. . |

FOREIGN PATENT DOCUMENTS 2232117 6/1972 Fed. Rep. of Germany ...... 248/394

Primary Examiner—Kenneth J. Dorner
Assistant Examiner—James M. Gardner
Attorney, Agent, or Firm—Harness, Dickey & Pierce

[57] ABSTRACT

A manually-operable six-way seat adjustment mechanism having a pair of laterally spaced tracks which are fixed securely to the vehicle's floor pan. A pair of carriages are slidably coupled to the tracks and are operable for synchronous longitudinal movement thereon. A seat assembly is fixedly secured to seat frame members supported from the elongated carriages for longitudinal movement therewith. A horizontal adjustment mechanism is operatively interconnected between each of the tracks and carriages to enable a seat occupant to selectively adjust the longitudinal position of the assembly. The manually-operable six-way seat adjustment mechanism also includes a front vertical adjustment mechanism and a rear vertical adjustment mechanism which are each operably interconnected between the laterally spaced seat frame members and the carriages to enable selective and independent vertical adjustment of their respective front and rear portions of the seat assembly. Finally, a travelling seat belt buckle anchorage arrangement is provided in association with at least one set of the slidably interconnected tracks and carriages for enabling selective longitudinal movement of a seat belt buckle anchor point with the seat assembly along the tracks while inhibiting vertical and horizontal separation therebetween.

23 Claims, 6 Drawing Sheets

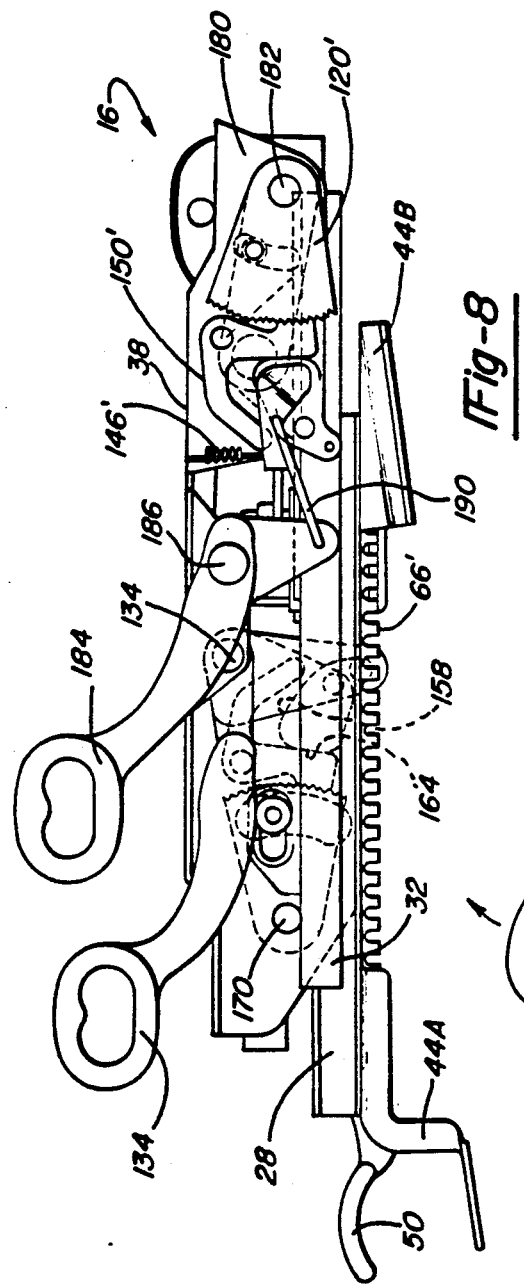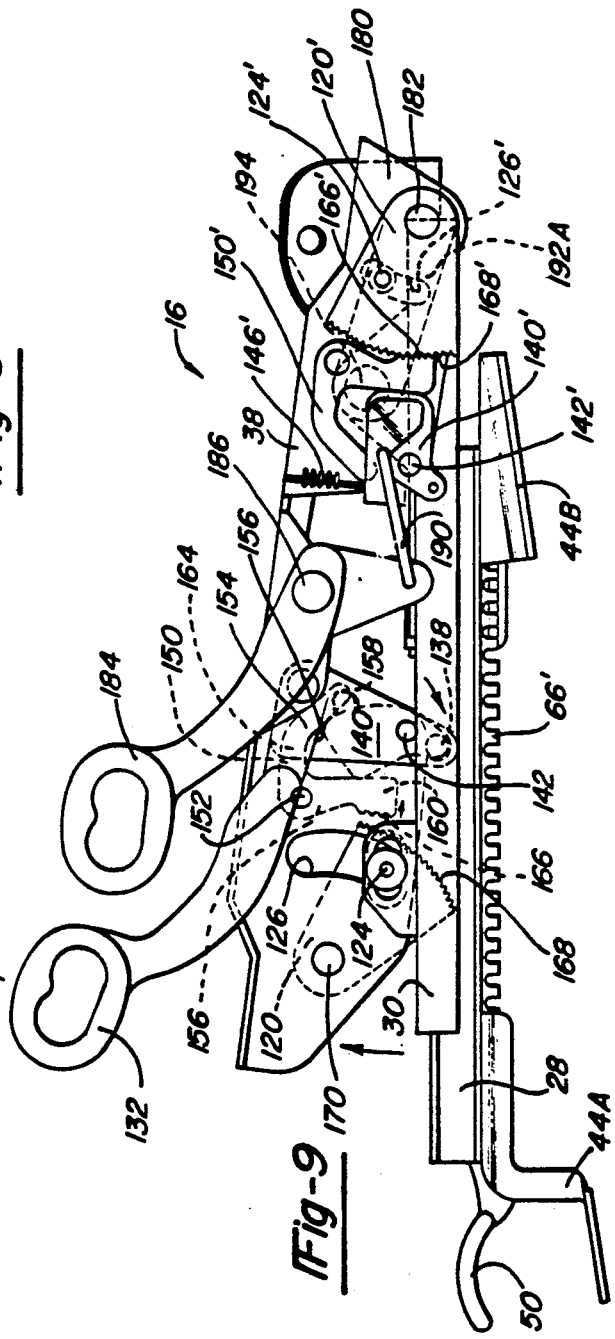

SIX-WAY MANUAL SEAT ADJUSTMENT MECHANISM

BACKGROUND OF THE INVENTION

The present invention relates generally to automotive vehicle seating and, more particularly, to an automotive vehicle seat assembly equipped with a manually operable six-way seat adjustment mechanism.

Traditionally, only the most expensive luxury vehicles have been equipped with seating systems that are selectively adjustable in multiple directions in addition to fore and aft adjustment. However, in light of recent consumer demands, most automobile manufacturers have found it necessary to offer enhanced seat adjustment capabilities on even the least expensive motor vehicles. Since the cost and weight penalties associated with conventional power seat adjustments systems make their application on smaller, less expensive vehicles generally impractical, the use of a manually-operable seat adjustment mechanism is largely dictated for such applications.

One type of manually-operable seat adjustment mechanism known in the art is commonly referred to as a "six-way" mechanism which is operable to provide independent height adjustment (i.e. up and down) for the front and rear portions of the seat member in addition to "fore and aft" longitudinal adjustment of the entire seat assembly. Generally, one or more actuation levers are provided which the seat occupant must manipulate to adjust the seat assembly to the desired comfort position. While most "six-way" seat adjustment mechanisms function satisfactorily, there remains a continuing need to improve their operation and reliability concomitantly with a reduction in structural complexity and manufacturing related costs.

In addition, the use of occupant impact protection or "restraint" systems are mandated for virtually all passenger-type motor vehicles. Traditionally, such restraint systems typically include a seat belt assembly for restraining the seat occupant during an emergency situation, such as during heavy braking or a vehicular collision. In many instances, the retractable seat belt and seat belt buckle are anchored directly to the floor pan of the motor vehicle along opposite lateral sides of the seat adjustment mechanism. Therefore, when the seat occupant adjusts the horizontal "fore and aft" position of the seat assembly, via selectively actuating the manually-operable seat adjustment mechanism, the seat belt tends to tighten or loosen relative to the seat occupant depending on the direction of longitudinal adjustment. As a result, the seat occupant is typically required to readjust the seat belt assembly to provide the proper restraint and comfort following seat adjustment.

In order to avoid the inconveniences associated with adjustable seat systems having floor mounted seat belt buckles, it is desirable to anchor the seat belt buckle to the seat adjustment mechanism for movement with the seat assembly during fore and aft positional adjustment. However, in order to incorporate a "travelling" seat belt buckle into a seat adjustment mechanism, it is required that such systems strictly comply with stringent strength requirements to insure adequate occupant restraint during vehicle emergency or impact conditions. This is due to the increased loading imposed on the seat belt buckle which is, in turn, transferred to the seat adjustment mechanism. Accordingly, there is also a continuing need to develop six-way seat adjustment mechanisms incorporating improved travelling seat belt buckle anchorage arrangements which possess the necessary structural and functional characteristics and which can be manufactured in a highly cost effective manner.

SUMMARY OF THE INVENTION

Accordingly, it is a primary object of the present invention to provide a manually-operable six-way seat adjustment mechanism that satisfies the afore-mentioned design and operational criteria. In general, the present invention is directed to an improved six-way seat adjustment mechanism operable to permit independent vertical height adjustment of the forward and rearward portions of a seat member in addition to fore and aft longitudinal adjustment of the entire seat assembly.

As a related object, the present invention is also directed to incorporation of a travelling seat belt buckle anchorage arrangement into the improved six-way seat adjustment mechanism. The travelling seat belt buckle anchorage arrangement is constructed to transfer vertically directed "separation" loads exerted on the seat belt buckle during a "loaded" situation through a sliding hook-type load bracket and into the vehicle floor pan via a specially configured structural riser. The structural riser is configured to include means for maintaining interlocked engagement with the sliding load bracket throughout the entire range of longitudinal fore and aft seat adjustment.

Another object of the present invention is to provide a six-way seat adjustment mechanism having horizontal adjustment means that includes primary and secondary locking means operable for permitting selective fore/aft longitudinal adjustment of the seat assembly while cooperatively increasing the resistance to forward excursions of the seat assembly during highly "loaded" conditions. As such, the horizontal adjustment means is coactive with the travelling seat belt buckle anchorage arrangement to transfer horizontally directed "shear" loads from the seat belt buckle through the primary and secondary locking means and into the vehicle's floor pan via the structural riser.

According to one preferred embodiment, the manually-operable six-way seat adjustment mechanism of the present invention includes a pair of laterally spaced stationary lower tracks which are fixed securely to the vehicle's floor pan. A pair of upper tracks, defining elongated carriages, are slidably coupled to the lower tracks and are operable for synchronous longitudinal movement thereon. The seat assembly is fixedly secured to seat frame members supported from the elongated carriages for longitudinal movement therewith. A horizontal adjustment mechanism is operatively interconnected between each of the tracks and carriages to enable the seat occupant to selectively adjust the longitudinal position of the carriages and, in turn, the seat assembly with respect to the tracks.

The manually-operable six-way seat adjustment mechanism also includes a front vertical adjustment mechanism and a rear vertical adjustment mechanism which are each operably interconnected between the laterally spaced seat frame members and the carriages to enable selective and independent vertical adjustment of their respective front and rear portions of the seat assembly. Cam actuated locking mechanisms are associated with each of the front and rear vertical adjustment mechanisms to permit the seat occupant to releasably retain the seat member in the desired vertical comfort position. Moreover, the locking mechanisms are substantially identical to provide commonality of parts and are designed to generate a highly desirable "in-line" locking arrangement which prevents unintended disengagement and/or seat "chucking".

In accordance with another feature of the present invention, the travelling seat belt buckle anchorage arrangement is operably associated with at least one set of the slidably interconnected lower tracks and carriages for enabling selective longitudinal movement of the seat belt buckle anchor point with the seat assembly along the lower tracks while inhibiting vertical and horizontal separation therebetween.

From the following written specification, taken in conjunction with the accompanying drawings and claims, it is believed that other objects, advantages and features of the present invention will be readily apparent to those skilled in the art.

BRIEF DESCRIPTION OF THE DRAWINGS

FIG. 8 is a side elevational view of the six-way seat adjustment mechanism illustrating the front and rear vertical adjustment mechanism in a "locked" condition in accordance with the present invention;

FIG. 9 is a side elevational view, similar to FIG. 8, showing the front vertical adjustment mechanism in a "released" condition for permitting selective vertical adjustment of the front portion of the seat assembly; and FIG. 10 is a side elevational view, similar to FIG. 8, showing the rear vertical adjustment mechanism in a "released" condition for permitting selective vertical adjustment of the rear portion of the seat assembly.

DETAILED DESCRIPTION OF THE INVENTION

Figure 1:
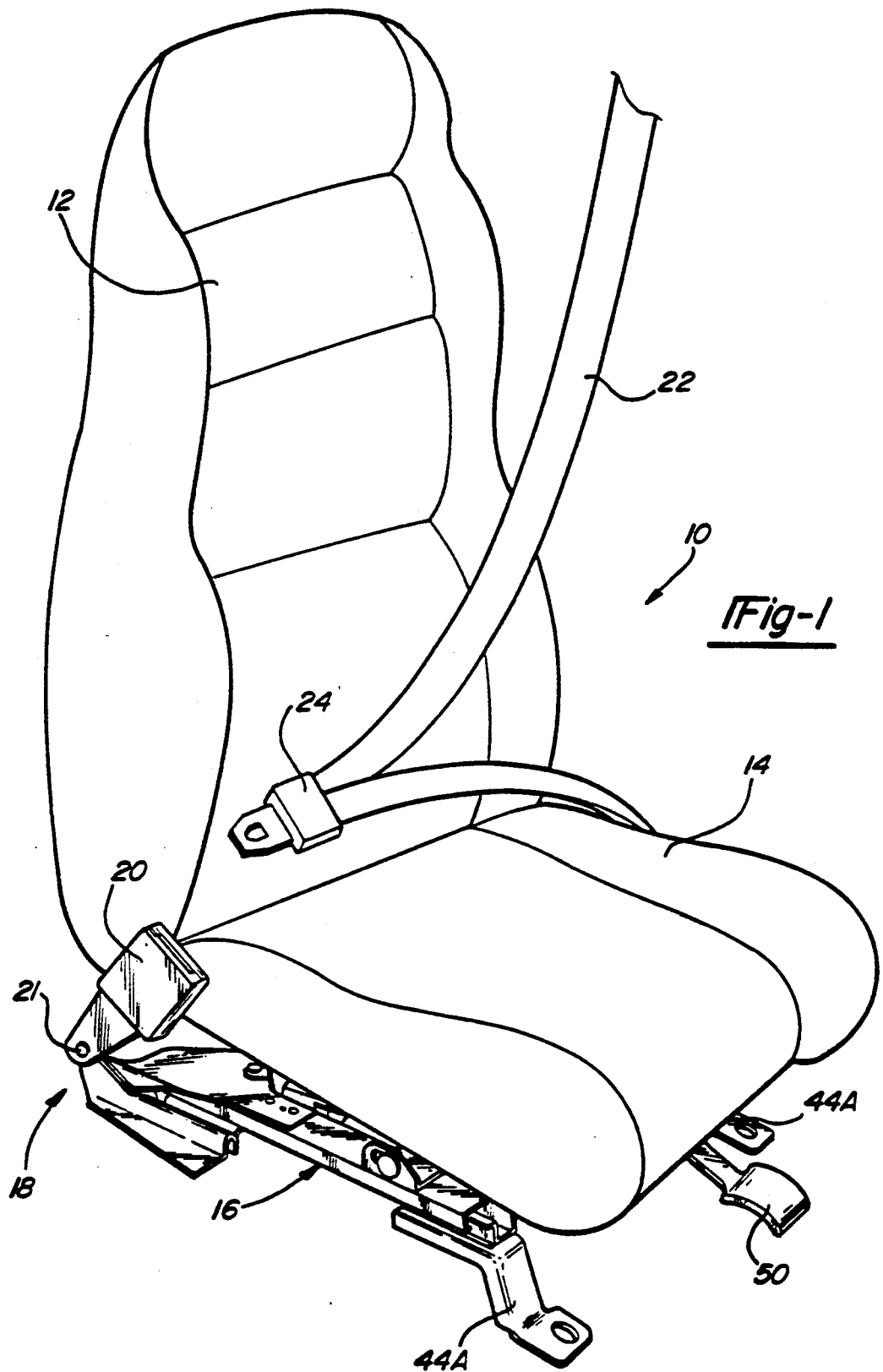
FIG. 1 is a pictorial view of an exemplary motor vehicle seat assembly shown mounted to the manually-operable six-way seat adjustment mechanism and travelling seat belt buckle anchor arrangement of the present invention.

With reference to FIG. 1, an exemplary motor vehicle seat assembly 10 is shown having an upholstered seat back 12 and seat member 14. Seat member 14 is shown mounted on a manually operable six-way seat adjustment mechanism 16. As will be described hereinafter in greater detail, six-way seat adjustment mechanism 16 is of the type providing fore and aft longitudinal sliding movement of seat assembly 10 with respect to the motor vehicle's floor pan as well as independent vertical height adjustment of the front and rear sections of seat member 14.

A travelling seat belt buckle anchorage arrangement 18 is shown to include a seat belt buckle 20 pivotably secured about an anchor point 21 to an inboard portion of seat adjustment mechanism 16 for longitudinal fore and aft movement with seat assembly 10 with respect to the floor pan. A retractable shoulder and seat belt webbing assembly 22 is shown having a latch 24 releasably connectable to buckle 20 for restraining a vehicle occupant seated within seat assembly 10. While seat assembly 10 is shown as a driver's side seat unit, it will be appreciated that mirror-imaged versions of six-way adjustment mechanism 16 and travelling seat belt buckle anchorage arrangement 18 would also be well-suited for installation as passenger-side seat units.

With particular reference now to FIGS. 2 through 6, the various components associated with manually-operable six-way seat adjustment mechanism 16 are illustrated in greater detail. In the specific embodiment shown, seat adjustment mechanism 16 is operable for permitting the seat occupant to manually adjust the vertical (i.e. up or down) position of the forward and rearward ends of seat member 14 and the horizontal position of seat assembly 10 (i.e. in the "fore and aft" directions). In addition, the function and structure of travelling seat belt anchor arrangement 18 is similar to that disclosed in copending U.S. patent application Ser. No. 728,135, filed Jul. 10, 1991, commonly owned by the Assignee of the present invention, the disclosure of which is expressly incorporated by reference herein.

In general, manually-operable six-way seat adjustment mechanism 16 includes a floor-mounted base defined by a pair of laterally spaced, lower stationary rails or tracks 26 and 28, upper carriages 30 and 32, a horizontal adjustment mechanism 34, seat frame members 36 and 38, a first or "front" vertical adjustment mechanism 40, a second or "rear" vertical adjustment mechanism 42, and travelling inboard buckle anchor arrangement 18.

Figure 2:
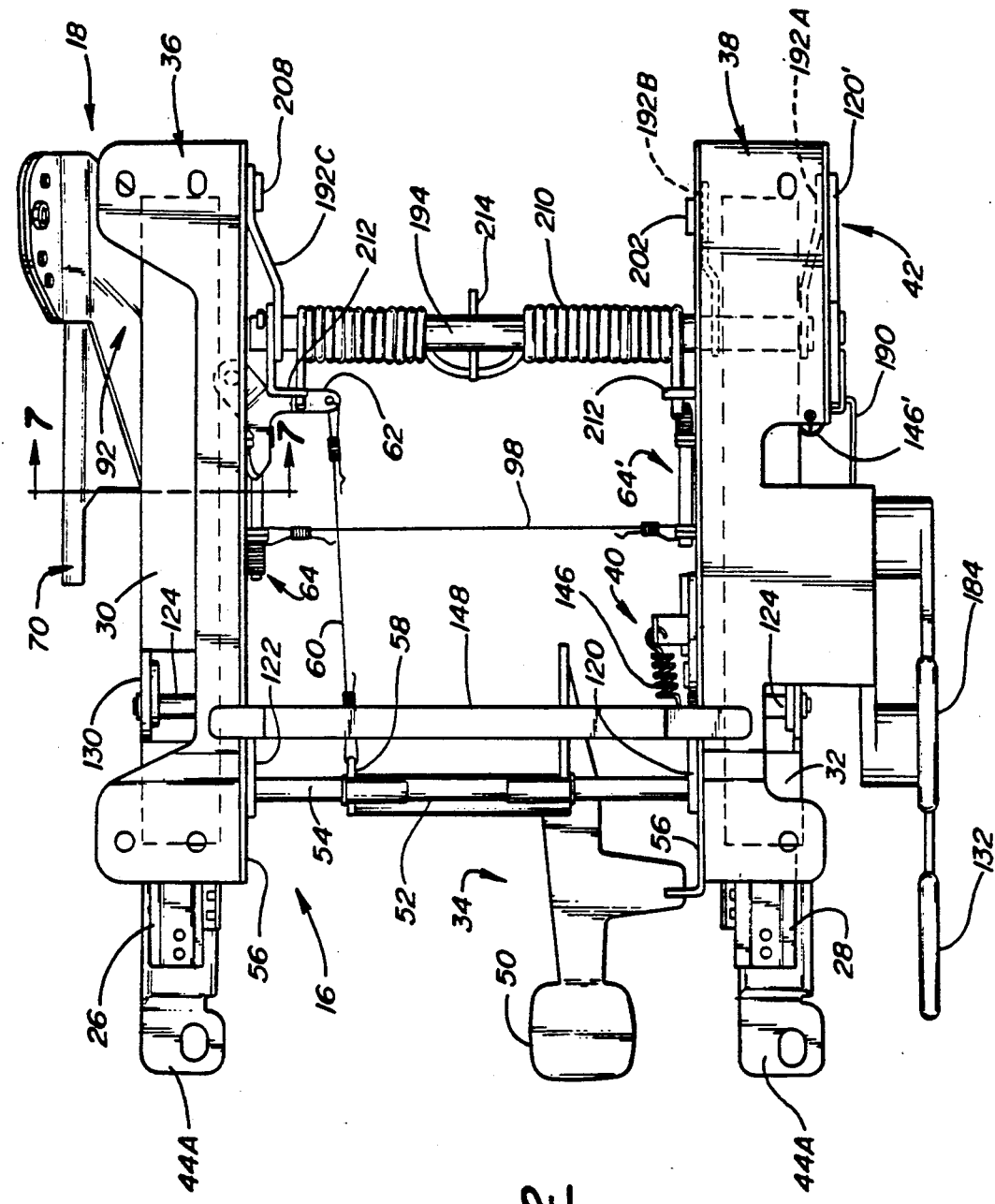
FIG. 2 is a plan view of the manually-operable six-way seat adjustment mechanism and travelling seat belt buckle anchor arrangement shown in FIG. 1.
Figure 3:
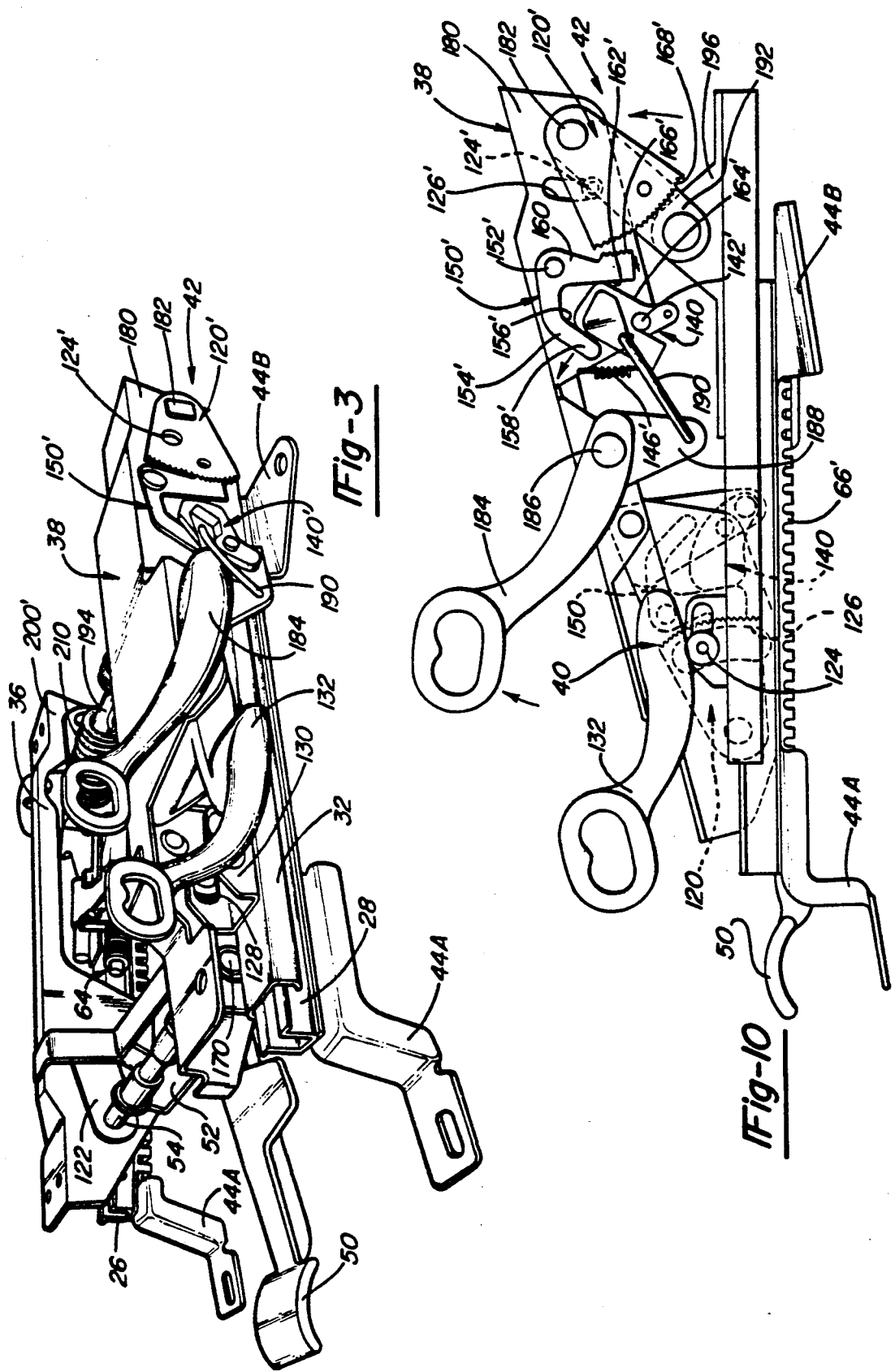
FIGS. 3 and 4 are perspective views illustrating the various components associated with the manually-operable six-way seat adjustment mechanism and travelling seat belt buckle anchor arrangement of the present invention.
Figure 4:
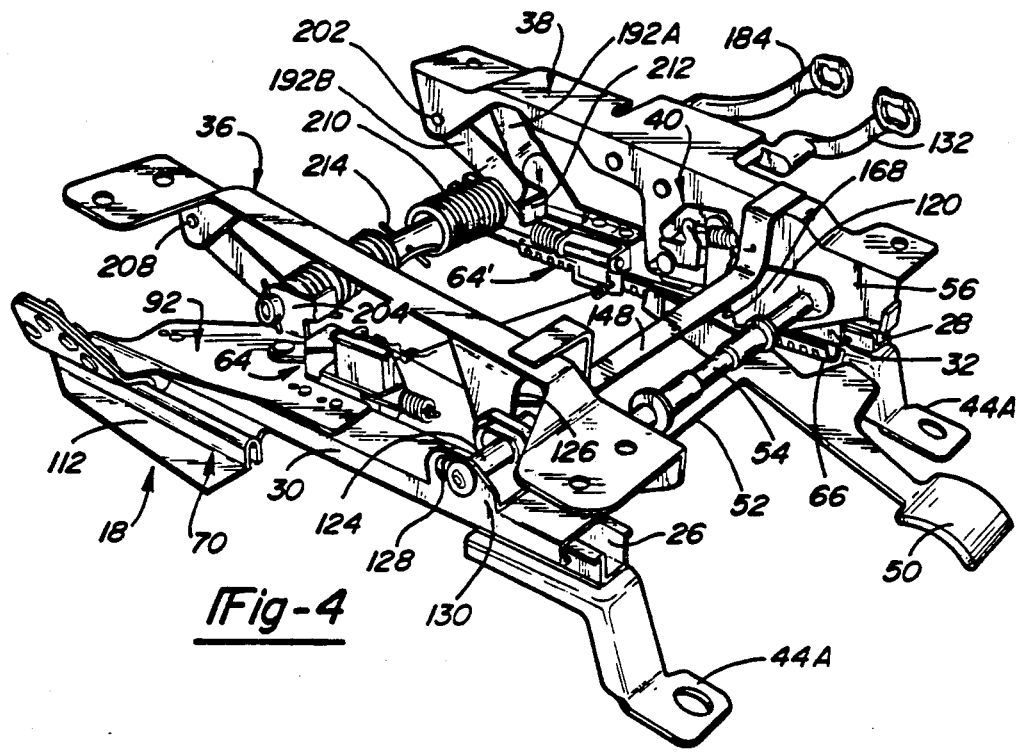

As best seen in FIGS. 2 through 4, tracks 26 and 28 are constructed as elongated, U-shaped members which include, or are affixed to, front and rear mounting members 44A and 44B, respectively, for directly securing tracks 26 and 28 to the floor pan of the motor vehicle. Carriages 30 and 32 are slidably mounted to lower tracks 26 and 28, respectively, for relative longitudinal movement in the horizontal (i.e. fore and aft) directions upon selective actuation of horizontal adjustment mechanism 34. In addition, the laterally spaced seat frame members 36 and 38, which are fastened (i.e. bolted) to the underside substructure of seat member 14 are pivotally mounted at their forward and rearward ends to carriages 30 and 32, respectively, via front and rear vertical adjustment mechanism 40 and 42, respectively, for providing independent front and rear vertical height adjustment of seat member 14. Moreover, since seat frame members 36 and 38 are secured to carriages 30 and 32, respectively, then entire seat assembly 10 is supported therefrom for longitudinal movement relative to lower tracks 26 and 28, respectively.

Figure 7:
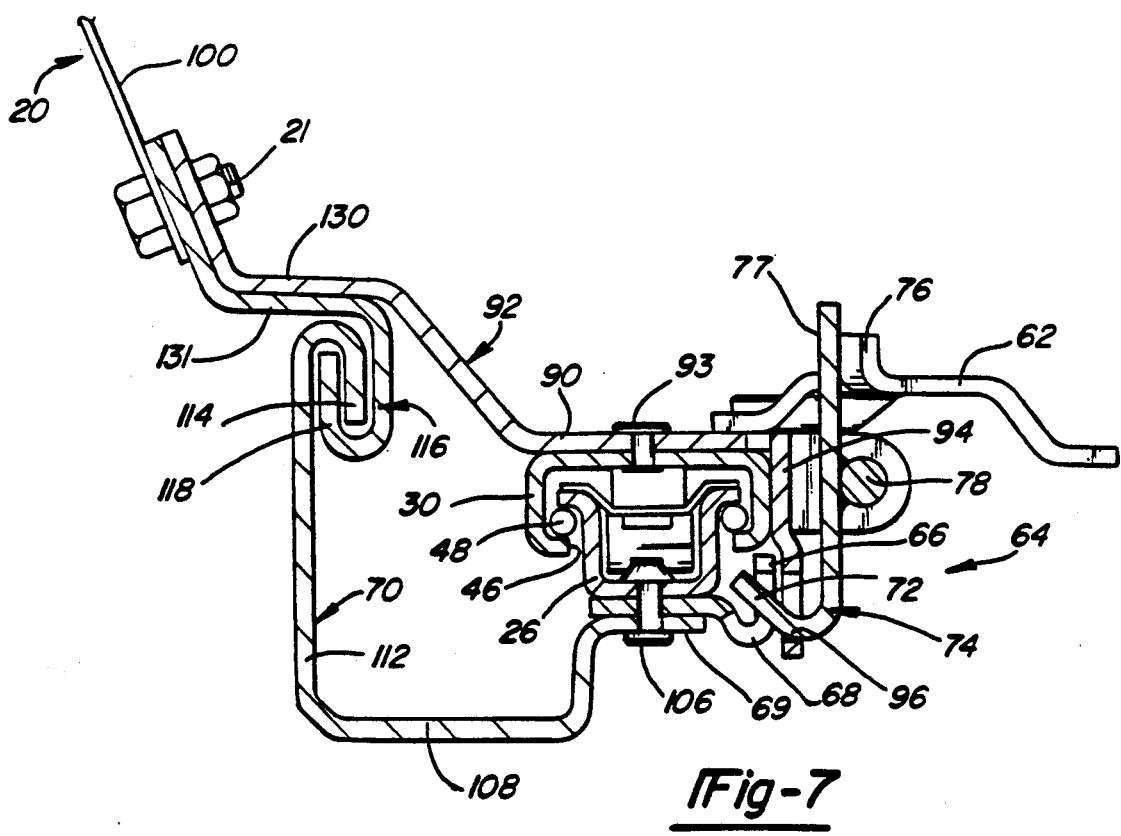
FIG. 7 is a sectional view taken along line 7—7 of FIG. 2.

Carriages 30 and 32 are elongated structural components that have an overall rectangular shape in cross-section with an open channel 46 formed along a lower portion thereof to enable lower tracks 26 and 28 to be slidably positioned within carriages 30 and 32, respectively. As seen in FIG. 7, a bearing assembly, generally shown at 48, is positioned between carriages 30 and 32 and tracks 26 and 28, respectively, to permit sliding movement of the carriages on the tracks along a substantially horizontal plane while minimizing frictional interference therebetween.

In accordance with the present invention, horizontal adjustment mechanism 34 is provided to permit the seat occupant to selectively adjust the fore/aft position of seat assembly 10 with respect to lower tracks 26 and 28. With particular attention to FIGS. 2 through 7, horizontal adjustment mechanism 34 is shown to include a manually-operable handle 50 that is fixably secured to a rigid crossbar 52. Crossbar 52 is rotatably supported from a transversely extending torsion bar 54 which is journally supported at its opposite ends between vertically extending flanged walls 56 of seat frame members 36 and 38. Crossbar 52 includes a down-turned flange 58 to which is secured to a first end of an actuation or "biasing" linkage 60. The opposite end of biasing linkage 60 is secured to a first latch lever 62.

In accordance with the present invention, mechanism 16 includes reinforced latching system 64 which works in cooperation with travelling seat belt anchor arrangement 18 to transfer horizontally directed "shear" loads imparted on seat belt buckle 20 into the vehicle's floor pan. With specific reference to FIGS. 6 and 7, reinforced latching system 64 is shown to include an elongated primary shear plate 66 that is fixedly secured along substantially the entire length of lower track 26 and which includes a first set of longitudinally oriented and equally spaced apertures 68. Preferably, primary shear plate 66 may be integrally formed with, or directly mounted to a horizontally extending flange portion 69 of a structural riser 70 that, as will be described hereinafter, is associated with travelling anchor arrangement 18. The first set of apertures 68, formed in primary shear plate 66, are configured and arranged to permit selective engagement and disengagement with a plurality of locking fingers 72, formed on a pivotally moveable locking arm 74.

In operation, as the seat occupant rotates handle 50 in an upward direction about torsion bar 54, crossbar 52 also rotates about torsion bar 54 for causing biasing linkage 60 to pivotably move first latch lever 62. More particularly, such pivotal movement of first latch lever 62 causes a striker 76 formed thereon to act on an upper flange portion 77 of locking arm 74 such that locking arm 74 pivots about a hinge assembly 77 for disengaging or "releasing" locking fingers 72 from the first series of apertures 68. Hinge assembly 77 is mounted to an inner flange portion of carriage 30 and includes an elongated hinge pin 78 that is fixedly secured to locking arm 74. A hinge spring 80 concentrically surrounds one end of hinge pin 78 for normally biasing hinge pin 78 and, in turn, locking arm 74 toward a "locked" position (FIG. 7) wherein the plurality of locking fingers 72 are lockingly received in a corresponding plurality of first apertures 68 in primary shear plate 66. In addition, the biasing force of hinge spring 80 acting on locking arm 74 and first latch lever 62 is sufficient to cause biasing linkage 60 to rotate crossbar 52 for returning handle 50 to its normally downwardly oriented "locked" position upon release of handle 50 by the seat occupant. As will be appreciated, use of the plurality of locking finger 72 formed on the relatively elongated locking arm 74 is effective in distributing the horizontally directed shear loading applied thereto, following the desired longitudinal seat adjustment.

Figure 6:
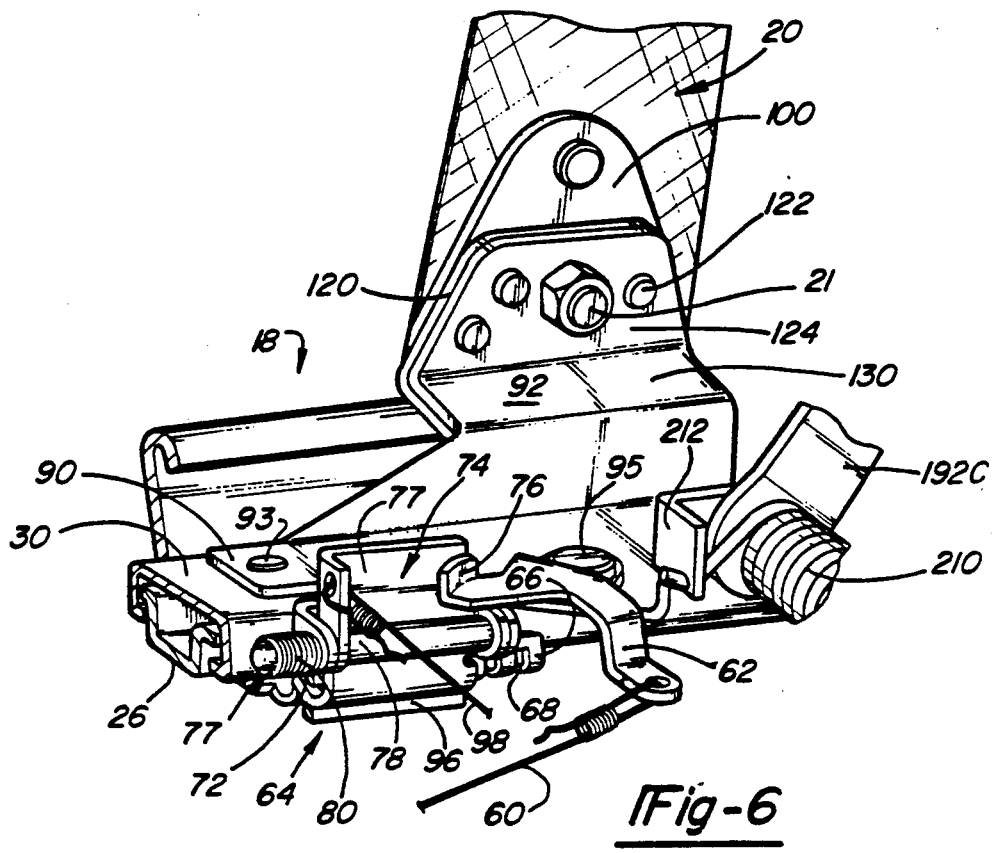
FIG. 6 is a partial perspective view illustrating various components associated with the horizontal adjustment mechanism and the travelling seat belt buckle anchor arrangement.

With continued reference to FIGS. 6 and 7, a lower horizontal flange portion 90 of a reinforcement bracket 92 is shown to extend over carriage 30 and is fixedly secured thereto, such as by rivets 93 for movement with carriage 30. In addition, first latch lever 62 is supported on flange portion 90 for pivotable movement about pivot point 95. A vertically extending bracket 94 is fixedly secured (i.e. welded) to carriage 30 so as to be disposed between carriage 30 and primary shear plate 66. As such, bracket 94 acts as a secondary shear plate on which a second series of longitudinally oriented and equally spaced apertures 96 are formed which are aligned for receipt of locking fingers 72 therethrough. Since bracket 94 and locking arm 74 are fixed for movement with carriage 30, the first and second series of apertures 68 and 96, respectively, are readily alignable for cooperative receipt of locking fingers 72 therein. In this manner, carriage 30 is effectively "locked" in a desired longitudinal fore and aft location upon release of handle 50 by the seat occupant. Furthermore, secondary shear plate 94 is provided to cooperate with primary shear plate 66 for effectively transferring "shear" loading exerted on seat assembly 10 through structural riser 70 and into the vehicle's floor pan. Preferably, primary shear plate 66 and secondary shear plate 94 are oriented in relatively close proximity to one another for augmenting the resistance of reinforced latching system 64 to the shear loading exerted thereon.

Figure 5:
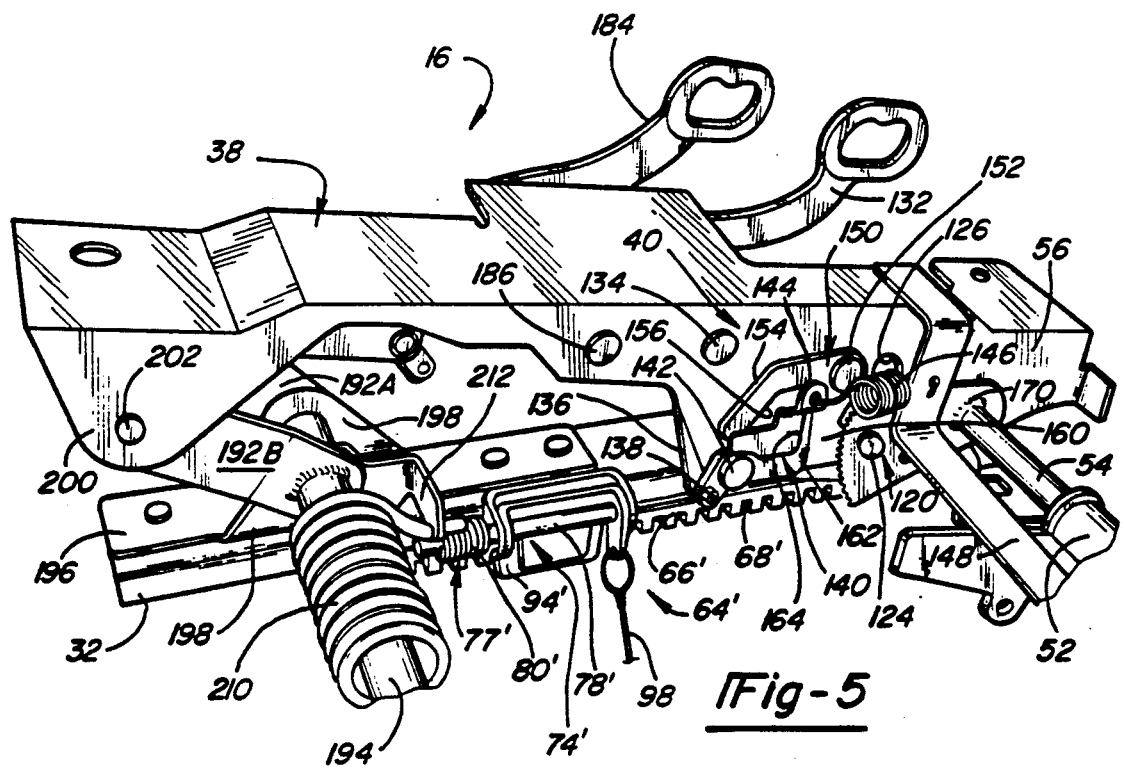
FIG. 5 is a partial perspective view showing various components of the horizontal adjustment mechanism and the forward vertical adjustment mechanism.

As best seen in FIGS. 4 and 5, a reinforced latching system 64' is associated with the outboard side of seat adjustment mechanism 16 for releasably locking carriages 32 on lower track 28. Reinforced latching system 64' is substantially similar to that shown and described for reinforced latching system 64 such that like numbers, primed to identify use on the outboard side of seat mechanism 16, are used to designate similar parts to those herebefore described. In view of the foregoing description, only a brief description of reinforced latch system 64' is given herein. Preferably, reinforced latching system 64' is a "slave" system which is arranged to function synchronously with, and in response to, actuation of reinforced latching system 64. Accordingly, reinforced latching system 64' includes an elongated primary shear plate 66' fixed to lower track 28, a hinge assembly 77' and locking arm 74' supported from carriage 32, and a secondary shear plate 94'. To function as a "slave" system, a second actuation or "biasing" link 98 interconnects a portion of locking arm 74' to upper flange portion 77 of locking arm 74 such that selective upward movement of handle 50 causes locking arms 74 and 74' to pivot to their respective "released" positions relative to primary shear plates 66 and 66' in a substantially synchronous manner.

As will be appreciated, when handle 50 is released, locking arms 74 and 74' are biased by hinge springs 80 and 80', respectively, for causing locking fingers 72 and 72', respectively, to move to a position of "locked" engagement with their respects sets of aligned first and second apertures formed in their respective primary shear plates 66, 66' and secondary shear plates 94, 94'. As such, carriages 30 and 32 and, in turn, the entire seat assembly 10 can be longitudinally moved for selective "fore and aft" adjustment.

With continued reference to FIGS. 2 through 7, it will be seen that the inboard portion of six-way seat adjustment mechanism 16 incorporates travelling inboard buckle anchor arrangement 18. In general, travelling inboard buckle anchor arrangement 18 is operatively interconnected between lower track 26 and its longitudinally moveable carriage 30 for providing means to secure an anchor portion 100 of seat belt buckle 20 for longitudinal sliding movement with carriage 30. Accordingly, travelling inboard seat belt anchor arrangement 18 is designed to provide sufficient load carrying capacity to insure against separation (i.e., peeling) of carriage 30 from lower track 26 during a "loaded" condition (i.e. heavy braking or vehicular collision). As such, seat adjustment mechanism 16 is configured to transfer both horizontally directed forces (i.e. shear) and vertically directed forces (i.e., peeling) to the vehicle's floor pan. Preferably, travelling buckle anchor arrangement 18 is operably associated with reinforced latching system 64 of horizontal adjustment mechanism 34 to provide means for securely retaining the fore/aft position of seat assembly 10. Finally, travelling inboard buckle anchor arrangement 18 also includes means for limiting the pivotable forward excursions of buckle attachment point 21 during the "loaded" conditions.

With particular reference to FIGS. 6 and 7, travelling seat belt buckle anchor arrangement 18 is shown to include rigid structural riser 70 having horizontally extending planar flange 69 upon which lower track 26 is securely mounted such as by rivets 106. Riser 70 is configured to form an integral rear mounting pad 108 for permitting direct attachment of seat adjustment mechanism 16 to the vehicle's floor pan. Riser 70 has a generally vertically extending wall portion 112 that terminates in a down-turned hook or curled lip 114 which extends substantially along the entire length of riser 70. Preferably, curled lip 114 and vertical wall portion 112 are substantially parallel to the longitudinal axis of lower track 26. While the open side of hook-shaped curl 114 may be formed either inwardly (i.e. toward seat track 26) or outwardly (i.e. away from seat track 26) it is shown preferably formed to extend away therefrom.

As best seen in FIG. 7, a sliding load or buckle bracket 116, configured as a generally J-shaped rigid member includes an up-turned hook or curled lip 118 that is adapted to be slidably interlocked with hook-shaped curled lip 114 formed on riser 70. During normal operation of seat adjustment mechanism 16, hook-shaped curled lips 114 and 118 are not in actual contacting engagement so as to inhibit frictional interference upon sliding movement therebetween.

Buckle bracket 116 also includes a planar portion 120 that is fixedly secured, such as by rivets 122, to a co-planar surface of an upper end portion 124 of sliding reinforcement bracket 92. As noted, horizontally extending flange portion 90 of reinforcement bracket 92 is secured to carriage 30 via rivets 93. As such, buckle bracket 116 and reinforcement bracket 92 are slidably moveable with carriage 30 with respect to stationary riser 70 and lower track 26. In addition, the up-turned curled lip 118 of J-shaped buckle bracket 116 is so arranged for maintaining continuous sliding interlocked engagement with hook-shaped curled lip 114 of riser 70 throughout the entire range of fore and aft longitudinal travel of carriage 30 on lower track 26.

To provide means for limiting the pivotal excursion of buckle anchor point 21, reinforcement bracket 92 and buckle bracket 116 each include horizontally extending flange portions 130 and 131, respectively, which are of sufficient length to extend over hook-shaped curled lip 114 of riser 70 to a position well forward of belt anchor point 21. As such, flange portions 130 and 131 act to augment the resistance to "peeling" of carriage 30 from lower track 26 upon vertically directing separation loads being imparted on buckle 20. This augment resistance is accomplished by maintaining the interlocked engagement of curled lip 114 on riser 70 and curled lip 118 on J-shaped buckle bracket 116. More particularly, forward pivotal loading about attachment point 21 tends to cause a forward end portion of flange 131 on buckle bracket 116 to engage curled lip 114 on riser 70 so as to further inhibit separation between the interlocked curled lips 114 and 118.

In accordance with another feature of the present invention, front and rear vertical adjustment mechanisms 40 and 42, respectively, are provided which are independently operable for permitting the seat occupant to selectively adjust the front and rear height of seat member 14. As seen from FIGS. 4 and 5, front vertical adjustment mechanism 40 includes a toothed sector or quadrant 120 and a lifting link 122 which are fixedly secured adjacent to the opposite ends of torsion bar 54. The ends of torsion bar 54 are journally supported between flange portions 56 of seat frame members 36 and 38 for rotatable movement with respect thereto. In general, lifting link 122 acts as a "slave" linkage for causing substantial concurrent vertical height adjustment of seat frame member 36 in response to vertical height adjustment of seat frame member 38. Therefore, torsion bar 54 acts to keep the rotational position of toothed quadrant 120 synchronized with respect to lifting link 122 to ensure accurate and simultaneous "side-to-side" height adjustment of seat member 14.

Lifting link 122 and toothed quadrant 120 are coupled to carriages 30 and 32, respectively, to support the front end of seat frame members 36 and 38, respectively, via a pair of support pins 124 fixedly attached thereto. Support pins 124 extend through arcuate slots 126 formed in inner flange portion 56 on each of seat frame members 36 and 38 and project through elongated apertures 128 formed in corresponding mounting brackets 130 fixedly secured to carriages 30 and 32. The length of elongated apertures 128 formed in the mounting brackets 130 is selected to accommodate relative sliding movement of support pins 124 within arcuate slots 126 during vertical height adjustment of the front and rear portions of seat frame members 36 and 38.

Front vertical adjustment mechanism 40 further includes a handle 132 that is pivotably secured to seat frame member 38 for rotation about a pivot point 134. A lower flange portion 136 of handle 132 is coupled via a connector pin 138 provided to a locking cam 140. Locking cam 140 is supported from inner flange portion 56 of seat frame member 38 for pivotable movement about pivot point 142. An upturned portion 144 of locking cam 140 is formed with an aperture adapted for receiving a first end of a return spring 146. The opposite end of return spring 146 is fastened to a portion of a transversely extending cross member 148 which is provided for rigidly interconnecting the laterally spaced seat frame members 36 and 38. Return spring 148 provides means for normally biasing locking cam 140 and handle 132 to the "locked" position shown in FIGS. 5 and 8 wherein the front portion of seat member 14 is lockingly inhibited from any vertical movement. Locking cam 140 is supported for pivotable motion about pivot point 142 within a cut-out portion of a generally C-shaped pawl member 150. The C-shaped pawl member 150 is supported from inner flange portion 56 of seat frame member 38 for pivotable movement about pivot point 152. More particularly, C-shaped pawl 150 includes a first rearwardly extending leg 154 having an inner peripheral edge surface 156 configured to engage a first camming surface 158 formed on locking cam 140 when handle 132 is rotated upwardly by the seat occupant to the released position shown in FIG. 9. In addition, C-shaped pawl 150 includes a second, generally downwardly extending, leg 160 having an inner peripheral surface 162 adapted to lockingly engage a second camming surface 164 formed on locking cam 140 when handle 132 is in the "locked" position shown in FIGS. 5 and 8. In addition, a portion of second leg 160 opposite surface 162 is formed with a plurality of teeth 166 which are adapted to move with pawl 150 between positions of locked engagement and released disengagement with teeth 168 formed on the peripheral edge of quadrant 120. Quadrant teeth 168 are configured as an arcuate tooth-form having its arc center located at pivot point 170 about which quadrant 120 is secured for rotation.

Since toothed quadrant 120 and lifting link 122 are fixedly secured to torsion bar 54, with elongated pins 124 confined within arcuate slots 126, any vertical movement (i.e., up and down) of seat frames 36 and 38 results in corresponding rotational movement of torsion bar 54 relative thereto. As such, the front portion of seat frame brackets 36 and 38 are releasably "locked" in a desired vertically adjusted position by engagement of pawl teeth 166 with the mating quadrant teeth 168. Similarly, upon disengagement of pawl teeth 166 member 14 is "released" for permitting the desired height adjustment.

In accordance with another feature of the present invention, the locking arrangement of front vertical adjustment mechanism 40 is designed such that second leg 160 of pawl 150 is retained in locked engagement with quadrant 120 due to second camming surface 164 being normally biased by return spring 146 into engagement with inner surface 162 of pawl 150. This locked engagement is configured to extend along a substantial length of surfaces 162 and 164 for defining a "line of contact" generally opposite to the center of engagement between the teeth. In addition, locking cam pivot point 142 is situated such that its center, the center of tooth engagement, and the center of quadrant pivot point 170 are roughly in linear alignment to provide an "in-line" locking relationship between the various components with is substantially perpendicular to the "line of contact" engagement between pawl surface 162 and locking cam surface 164. In this manner, unintentional disengagement of locking cam 140, toothed pawl 150 and toothed quadrant 120 is inhibited while concomitantly functioning to prevent the propagation of ""chucking" between the intermeshed teeth.

As can be seen, only toothed quadrant 120 is formed with teeth 168. As noted, lifting link 122 is primarily a "slave" member for providing synchronous "side-to-side" vertical adjustment but which does not require a corresponding latching arrangement, since the locking arrangement (i.e., pawl 150 and quadrant 120) is sufficient for securely locking the entire front end of seat member 14 in the desired vertically adjusted position.

With particular reference now to FIGS. 8 and 9, the operation of front vertical adjustment mechanism 40 will be described. When the seat occupant lifts up or "pulls" on handle 132, against the biasing of return spring 146, locking cam 140 is pivotably rotated about pivot point 142 such that its first camming surface 158 engages internal peripheral edge surface 156 of first pawl leg 154. Continued rotation of locking cam 140 causes second camming surface 164 to move out of its "line of contact" locking engagement with surface 162 on second pawl leg 160, thereby disengaging pawl teeth 166 from quadrant teeth 168. With pawl teeth 166 disengaged from quadrant teeth 168, quadrant 120 and left link 122 are free to rotate with torsion bar 54. Since pins 124 effectively couple seat frame members 36 and 38 to carriages 30 and 32, respectively, seat frame members 36 and 38 are also free to move vertically, either up or down, through a range of motion defined by pins 124 and arcuate slots arcuate slots 126. As such, upward vertical adjustment of the front portion of seat member 14 from the lowered position shown in FIG. 8 to the raised position shown in FIG. 9 is achieved by the seat occupant shifting his/her weight rearwardly on seat member 14 and/or lifting in an upward direction on seat member 14.

Upon release of handle 132, the biasing force of return spring 146 pivots locking cam 140 such that its second camming surface 164 acts on inner surface 162 of second pawl leg 160 for causing meshed engagement of pawl teeth 166 with quadrant teeth 168, thereby locking vertical adjustment mechanism 40 against further vertical movement of the front portions of seat frame members 36 and 38. To return the front portions of seat frame members 36 and 38 to the lower or substantially horizontal position shown in FIG. 8, the seat occupant simply lifts upwardly on handle 132 for releasing pawl teeth 166 from quadrant teeth 168. Preferably, the weight of the seat occupant will be sufficient to cause the front portion of seat members 36 and 38 to move vertically downwardly until handle 132 is again released.

With particular reference now to FIGS. 3 through 5 and 8 through 10, the components and operation of rear vertical adjustment mechanism 42 are shown in greater detail. In general, rear vertical adjustment mechanism 42 utilizes numerous components which are substantially identical to the components described in association with front vertical adjustment mechanism 40. As such, seat adjustment mechanism 16 includes numerous standardized parts which result in reduced manufacturing and assembly related costs.

In the embodiment disclosed, rear vertical adjustment mechanism 42 is shown to be operatively supported from a vertically extending flange portion 180 of seat member 38. Rear vertical adjustment mechanism 42 includes a quadrant 120' that is supported for pivotable movement about pivot point 182 and a support pin 124' extending through arcuate slot 126'. The length and configuration of arcuate slot 126' is selected to define the range of vertical adjustment for the rear portion of seat member 14. Rear vertical adjustment mechanism 42 further includes a handle 184 that is pivotably secured to seat frame member 38 for rotation about pivot point 186. A lower flange portion 188 of handle 184 is coupled to a first end of a drive link 190, the second end of drive link 190 being coupled to a portion of a locking cam 140'. Locking cam 140' is supported from flange portion 180 of seat frame member 38 for pivotable movement about pivot point 142'. In addition, locking cam 140 ' includes an aperture adapted for receiving a first end of return spring 146', the opposite end of which is fastened to a rigid portion of seat frame member 38. Return spring 146' provides means for normally biasing locking cam 140' and, in turn, handle 184 to a "locked"

position whereby height adjustment of the rear portion of seat member 14 is inhibited.

Locking cam 140' is supported for pivotable motion about pivot point 142' within cutout portion of C-shaped pawl member 150'. Pawl member 150' is supported from flange 180 of seat frame member 38 for pivotable movement about pivot point 152'. C-shaped pawl 150' includes a first leg 154' having an inner peripheral edge surface 156' that is configured to engage a first camming surface 158' formed on locking cam 140' when handle 184 is rotated upwardly by the seat occupant to the "released" position shown in FIG. 10. In addition, C-shaped pawl 150' includes a second leg 160' having an inner peripheral surface 162' adapted to lockingly engage a second camming surface 164' formed on locking cam 140' when handle 184 is returned to the "locked" position shown in FIGS. 8 and 9. Second pawl leg 160' is formed with a plurality of teeth 166' which are movable between positions of locked engagement and released disengagement with quadrant teeth 168' upon rotation of pawl 150' about pivot point 152'.

To provide an increased range of vertical height adjustment, quadrant 120' is pivotably coupled about pivot point 182 to a first end of a first lift link 192A. The second end of first lift link 192A is secured to a first end of an elongated torque tube 194. The first end of torque tube 194 is journally supported within a mounting bracket 196 fixedly secured to carriage 32 and which has a pair of laterally spaced and upwardly extending braces 198. Braces 198 have aligned apertures through which the first end of torque tube 194 is journally supported. Preferably, first lift link 192A is fixedly secured to torque tube 194 so as to be adjacent an outer surface of the outboard brace 198. One end of a second, substantially identical, lift link 192B is fixedly secured to torque tube 194 so as to be adjacent an inner surface of the inboard brace 198. The opposite end of lift link 192B is pivotably supported from an inner flange portion 200 of seat frame member 38 for pivotable movement about pivot point 202. As will be appreciated, pivot point 202 and pivot point 182 are aligned along a common axis for synchronously lifting the rear portion of seat frame member 38 in a manner to be described hereinafter.

For synchronously transferring vertical adjustment of seat frame member 38 to seat frame member 36, an upstanding brace 204 is formed on reinforcement bracket 92 which has an aperture for journally supporting the opposite end of torque tube 194 therein. In addition, one end of a third lift link 192C is fixedly secured to torque tube 194 so as to be adjacent an inner surface of brace 204. The opposite end of third lift link 192C is supported for pivotable movement about a pivot point 208 on inner flange portion 200' of seat frame member 36. Pivot point 208 is aligned on the common axis with pivots 182 and 202 such that rotational movement of quadrant 120' causes corresponding rotational movement of lift link 192A which, in turn, is transferred through torque tube 194 to second and third lift links 192B and 192C, respectively, for synchronously adjusting the vertical position of the rear portions of seat frame members 38 and 36, respectively. A large helical torsional-assist or counterbalance spring 210 is provided in concentric surrounding relation to torque tube 194 with its opposite terminal ends engaging flange members 212 that extend from carriages 30 and 32. A pin 214, fixedly secured to a central portion of torque tube 194, is wrapped-over a central portion of counterbalance spring 210 such that the biasing force generated by counterbalance spring 210 is transferred directly to torque tube 194.

In operation, the biasing force exerted by counterbalance spring 210 on torque tube 194 is operable to raise the rear portion of seat member 14 to its uppermost position upon release of pawl teeth 166' from quadrant teeth 168' in response to the seat occupant pulling up on handle 184. The locking arrangement of the various components associated with rear vertical adjustment mechanism 42 define the "line of contact" camming engagement between the mating surfaces of pawl 150' for maintaining locked engagement of pawl teeth 166' with quadrant teeth 168'. In addition, locking cam pivot point 142' is again situated such that its center, the center of tooth engagement, and the center quadrant pivot point 182 are roughly in linear alignment to provide the "in line" locking relationship which is substantially perpendicular to the "line of contact" camming engagement.

According to the preferred embodiment, rear vertical adjustment mechanism 42 is constructed and arranged to allow a small amount of downward travel from the conventional normal seat position (i.e., the "H" point) in addition to a significant amount of upward travel. In operation, when the seat occupant lifts up or "pulls" on handle 184 against the biasing of return spring 146', locking cam 140' is pivotably rotated about pivot 142' such that its first camming surface 158' engages internal peripheral edge surface 156' of pawl leg 154'. Continued rotation of locking cam 140' causes second camming surface 164' to move out of its "line of contact" locking engagement with surface 162' of second pawl leg 160', such that pawl 150' rotates about pivot point 152' for disengaging pawl teeth 166' from quadrant teeth 168'. Upon release of pawl teeth 166' from quadrant teeth 168', the biasing force of counterbalance spring 210 is transferred to torque tube 194 for rotating toothed quadrant 120' and each of the first, second and third lift links 192A, 192B, 192C about their respective pivot points such that seat frame members 36 and 38 concomitantly move vertically with respect to carriages 30 and 32, respectively, through the range of motion defined by pin 124' in arcuate slot 126'.

As best seen in FIG. 8, the rear portion of seat member 14 can be lowered slightly from the normal lowered position shown therein. In addition, from FIG. 9 it can be seen that the locked relationship of the various components associated with rear vertical adjustment mechanism 42 are unaffected by selective actuation of front vertical adjustment mechanism 40. However, height adjustment of the front portions of seat frame members 36 and 38 is relative to pivot points 182, 202 and 208 of the three lift links so as to compensate for the change in angularity of seat members 36, 38 with respect to the vehicle's floor pan. Finally, upon adjusting the vertical position of rear portion of seat member from the lowered position shown in FIG. 8 to the raised position shown in FIG. 10, the slight forward motion of seat frame members 36 and 38 relative to carriages 30 and 32, respectively, is compensated for by the seat frame members moving slightly forward via sliding movement of pins 124 within apertures 128 of mounting brackets 130.

The foregoing discussion is merely intended to disclose and describe an exemplary embodiment of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A manually operable six-way seat adjustment mechanism for a motor vehicle comprising:

a pair of stationary tracks;

elongated carriages longitudinally movable on said tracks;

horizontal adjustment means operatively interconnecting said carriages to said tracks for permitting a seat occupant to selectively adjust the fore and aft position of said carriages with respect to said tracks;

a seat frame adapted to be fastened to the vehicle seat and having front and rear portions pivotably coupled to said elongated carriages;

first vertical adjustment means for vertically adjusting said front portion of said seat frame with respect to said rear portion thereof including:

a first quadrant and a first lift link fixably secured at opposite ends of a first torsion bar, said first torsion bar being journalled for rotation to said seat frame; and manually-operable means for permitting said seat occupant to selectively actuate said first vertical adjustment means, said manually-operable means including first camming means movable between a first position for releasably engaging said first quadrant to releasably lock said front portion of said seat frame at a selected vertical position, and a second position disengaged from said first quadrant for permitting vertical adjustment of said front portion of said seat frame;

second vertical adjustment means for vertically adjusting said rear portion of said seat frame with respect to said front portion thereof including:

a second quadrant supported from said seat frame for pivotable movement about a pivot point;

a second torsion bar journally supported for rotation from said carriages;

a second lift link having a first end fixably secured to said second torsion bar and a second end pivotably coupled to said second quadrant about said pivot point;

biasing means for normally biasing said second torsion bar and said second lift link such that said rear portion of said seat frame is biased toward an upper vertical position;

said manually-operable means also permitting said seat occupant to selectively actuate said second vertical adjustment means and including second camming means movable between a third position for releasably engaging said second quadrant to releasably lock said rear portion of said seat frame at a selected vertical position, and a fourth position disengaged from said second quadrant for permitting vertical adjustment of said rear portion of said seat frame; and a traveling seat belt buckle anchorage arrangement operably associated with one of said slidably interconnected tracks and carriages and said horizontal adjustment means to permit selective longitudinally movement of a seat belt buckle anchor with said seat frame along said track while inhibiting vertical and horizontal separation therebetween.

2. The seat adjustment mechanism of claim 1 further comprising means associated with each of said first and second vertical adjustment means for defining a predetermined range of vertical adjustment of said rear portion with respect to said front portion and said front portion with respect to said rear portion, respectively.

3. The seat adjustment mechanism of claim 1 wherein said first quadrant has a plurality of teeth formed thereon, and wherein said first camming means includes a first locking cam and a first toothed pawl that are pivotably mounted to said front portion of said seat frame, said first locking cam being movable between said first position wherein said first locking cam acts on said first toothed pawl for maintaining locked engagement of said first pawl teeth and said first quadrant teeth, and said second position when said first locking cam acts on said first toothed pawl for causing disengagement of said first pawl teeth from said first quadrant teeth in response to movement of said manually-operable means, said first camming means further comprising second biasing means for normally biasing said first locking cam toward said first position.

4. The seat adjustment mechanism of claim 3 wherein said second quadrant has a plurality of teeth formed thereon, and wherein said second camming means includes a second locking cam an a second toothed pawl that are pivotably mounted to said rear portion of said seat frame, said second locking cam being movable between said third position wherein said second locking cam acts on said second toothed pawl for maintaining locked engagement of said second pawl teeth and said second quadrant teeth, and said second position wherein said second locking cam acts on said second toothed pawl for causing disengagement of said second pawl teeth from said second quadrant teeth in response to movement of said manually-operable means, said second camming means further comprising third biasing means for normally biasing said second locking cam toward said third position.

5. The seat adjustment mechanism of claim 1 wherein said travelling seat belt buckle anchorage arrangement includes:

a stationary riser member fixedly secured to said track and the floor of the vehicle, said riser having a wall portion terminating in a first curled lip;

a slide bracket having a second curled lip formed on a first end thereof, said second curled lip positioned in an interlocked relationship with said first curled lip on said riser; and a reinforcement member having a first end rigidly secured to a second end of said slide bracket, and a first intermediate portion rigidly secured to said carriage such that said slide bracket and said reinforcement member are longitudinally movable with said carriage with respect to said riser and said track;

said seat belt buckle anchor being secured to at least one of said slide bracket and said first end of said reinforcement bracket for longitudinal movement therewith.

6. The seat adjustment mechanism of claim 5 wherein said horizontal adjustment means includes:

a lock arm supported for longitudinal movement with said carriage, said lock arm being pivotably movable between a locked position and a released position;

a primary shear plate rigidly secured to said riser and having first locking means for inhibiting longitudinal movement of said carriage when said lock arm is in said locked position;

a secondary shear plate supported for longitudinal movement with said carriage and having second locking means adapted to cooperate with said first locking means for assisting in inhibiting longitudinal movement of said carriage when said lock arm is in said locked position; and fourth biasing means for biasing said lock arm toward said locked position, said travelling seat belt buckle anchor arrangement being adapted to transfer horizontally directed loads imparted on said seat belt buckle anchor to the floor of the vehicle through said primary and secondary shear plates and said riser member.

7. The seat adjustment mechanism of claim 6 wherein said first curled lip of said riser and said second curled lip of said slide bracket are configured to maintain said interlocked relationship throughout the entire range of longitudinal movement of said carriage with respect to said track.

8. The seat adjustment mechanism of claim 7 wherein vertically directed loads exerted on said seat belt buckle anchor are transferred through said slide bracket to the vehicle floor via said riser for inhibiting separation of said carriage from said track.

9. The seat adjustment mechanism of claim 7 wherein said first locking means defines a series of longitudinally extending apertures formed on said primary shear plate, said second locking means defining a second series of longitudinally extending apertures formed on said secondary shear plate, and wherein said lock arm includes a plurality of locking fingers, whereby receipt of said locking fingers within aligned pairs of said first and second apertures when said lock arm is in said locked position is operable for transmitting said horizontally directed shear loads from said primary and secondary shear plates to said riser.

10. The seat adjustment mechanism of claim 9 wherein said horizontal adjustment means further includes a handle operable for pivotably moving said lock arm to said second released position against the biasing of said fourth biasing means for disengaging said locking fingers from said aligned pairs of first and second apertures, whereby said seat occupant is able to selectively adjust the longitudinally position of said seat frame.

11. The seat adjustment mechanism of claim 7 further comprising engagement means for limiting pivotable excursions of said seat belt buckle anchor, said engagement means including a second intermediate portion of said reinforcement member that is configured as a generally horizontally extending flange overlying said first curled lip of said riser, said second intermediate portion being of a sufficient longitudinal length so as to extend over said first curled lip of said riser to a position forward of an anchor point wherein said seat belt buckle anchor is secured to said first end of said reinforcement bracket and said second end of said slide bracket.

12. The seat adjustment mechanism of claim 4 wherein said seat frame comprises a pair of elongated members having rearward ends which are pivotally secured to said second end of said second lift link for rotation with said second torsion bar with respect to said carriages.

13. The seat adjustment mechanism of claim 12 wherein said first quadrant and said first lift link each include a pin fixed thereto at radially spaced points from said first torsion bar, said pins being journalled in apertures formed in support brackets mounted to said carriages.

14. The seat adjustment mechanism of claim 13 wherein said manually-operable means includes handle means pivotably supported from said seat frame for moving said first locking cam between said first position and said second position, said handle means being normally biased toward a locked position by said second biasing means, said handle means further operable to move said second locking cam between said third and fourth positions with said handle means normally biased toward said locked position by said third biasing means.

15. A vehicle seat comprising:

a base adapted to be secured to the floor of the vehicle and defining first and second laterally spaced longitudinal tracks;

first and second carriages slidably engaged with said first and second tracks, respectively, for longitudinal movement in fore and aft directions;

a seat frame supported for longitudinal movement with said first and second carriages;

a seat member of a seat assembly coupled to said seat frame;

a stationary riser member fixedly secured to said first track and the floor of the vehicle, said riser having a wall portion terminating in a first curled lip;

a slide bracket having a second curled lip formed on a first end thereof, said second curled lip positioned in an interlocked relationship with said first curled lip on said riser;

a reinforcement member having a first end rigidly secured to a second end of said slide bracket, and a first intermediate portion rigidly secured to said first carriage such that said slide bracket and said reinforcement member are longitudinally movable with said first carriage with respect to said riser and said first track;

a seat belt buckle anchor secured to at least one of said slide bracket and said first end of said reinforcement bracket for longitudinal movement therewith;

manually-operable horizontal adjustment means for permitting a seat occupant to selective adjust the longitudinal position of said carriages on said tracks including:

a pivotable lock arm supported for longitudinal movement with said first carriage, said lock arm pivotably movable between a locked position and a released position;

a reinforced locking mechanism operable for locking said carriages to said tracks when said lock arm is in said locked position, said reinforced locking mechanism including:

a primary shear plate rigidly secured to said riser and having first locking means for inhibiting longitudinal movement of said first carriage when said lock arm is in said locked position;

a secondary shear plate supported for longitudinal movement with said first carriage and having second locking means adapted to cooperate with said first locking means for assisting in inhibiting longitudinal movement of said first carriage when said lock arm is in said locked position; and biasing means for biasing said lock arm toward said first position, said manually-operable horizontal adjustment means adapted to transfer horizontally directed loads imparted on said seat belt buckle anchor to the floor of the vehicle through said primary and secondary shear plates and said riser member, actuation of said horizontal adjustment means operable to cause longitudinally movement of a seat belt buckle anchor with said seat assembly along said track while inhibiting vertical and horizontal separation therebetween;

first vertical adjustment means for permitting the seat occupant to vertically adjust a front portion of said seat member with respect to a rear portion thereof including:

a first toothed quadrant and a first lift link fixably secured at opposite ends of a first torsion bar, said first torsion bar being journalled for rotation to said seat frame;

means for activating said first vertical adjustment means including a handle and toothed pawl means operable for disengaging the teeth of said first toothed quadrant in response to movement of said handle to a first position for enabling selective vertical adjustment of said front portion of said seat member, said toothed pawl means operable for locking said front portion of said seat member at selected vertical positions in response to movement of said handle to a second position; and second biasing means for normally biasing said handle toward said first position; and second vertical adjustment means for permitting the seat occupant to vertically adjust said rear portion of said seat member with respect to said front portion thereof including:

a second toothed quadrant pivotably supported from a rear portion of said seat frame;

a second torsion bar journaly supported for rotation from said carriages;

a pair of transfer links each having a first end fixably secured to said second torsion bar and a second end pivotably mounted to said seat frame, one of said transfer links being pivotably coupled at its second end to said second toothed quadrant for rotation therewith;

third biasing means acting on said second torsion bar for causing said transfer links to normally rotate said rear portion of said seat frame toward an elevated vertical position; and means for activating said second vertical adjustment means including a second handle and second toothed pawl means operable for disengaging the teeth of said second toothed quadrant in response to movement of said second handle to a third position for enabling selective vertical adjustment of said seat member, said second toothed pawl means operable for locking said rear portion of said seat member at a selected vertical position in response to movement of said second handle to a fourth position.

16. The vehicle seat of claim 15 wherein said first curled lip of said riser and said second curled lip of said slide bracket are configured to maintain said interlocked relationship throughout the entire range of longitudinal fore and aft movement of said first carriage with respect to said first track.

17. The vehicle seat of claim 16 wherein said first locking means defines a series of longitudinally extending apertures formed on said primary shear plate, said second locking means defining a second series of longitudinally extending apertures formed on said secondary shear plate, and wherein said lock arm includes a plurality of locking fingers, whereby receipt of said locking fingers within aligned pairs of said first and second apertures when said lock arm is in said locked position is operable for transmitting said horizontally directed shear loads from said primary and secondary shear plates to said riser.

18. The vehicle seat of claim 17 wherein said manually-operable horizontal adjustment means further includes a third handle operable for pivotably moving said lock arm toward said released position against the biasing of said biasing means for disengaging said locking fingers from said aligned pairs of first and second apertures for permitting the seat occupant to selectively adjust the longitudinally position of said seat assembly with respect to said base.

19. The vehicle seat of claim 18 wherein said means for activating said first vertical adjustment means further includes a first locking cam pivotably movable about a first pivot point and having a first portion coupled to said handle and a second portion engageable with said first toothed pawl means, said locking cam being operable to move said teeth of said first toothed pawl means out of locking engagement with said teeth of said first toothed quadrant in response to the seat occupant moving said handle to said first position, said second biasing means acting on said first locking cam for normally biasing said first locking cam into engagement with said first toothed pawl means so as to cause said locked engagement between said teeth of said first toothed pawl and said teeth of said first toothed quadrant upon release of said handle by the seat occupant.

20. The vehicle seat of claim 19 wherein said first pivot point of said first locking cam, the center of tooth engagement of said first toothed pawl and said first toothed quadrant, and the center of said first toothed quadrant are substantially aligned in a linear manner.

21. The vehicle seat of claim 19 wherein said means for activating said second vertical adjustment means further includes a second locking cam pivotably movable about a second pivot point and having a first portion coupled to said second handle and a second portion engageable with said second toothed pawl means, said second locking cam being operable to move said teeth of said second toothed pawl means out of locking engagement with said teeth of said second toothed quadrant in response to the seat occupant moving said second handle to said third position, said third biasing means acting on said second locking cam for normally biasing said second locking cam into engagement with said second toothed pawl means so as to cause said locked engagement between said teeth of said second toothed pawl and said teeth of said second toothed quadrant upon release of said second handle by the seat occupant.

22. The vehicle seat of claim 21 wherein said second pivot point of said second locking cam, the center of tooth engagement of said second toothed pawl and said second toothed quadrant, and the center of said second toothed quadrant are substantially aligned in a linear manner.

23. A manually-operable six-way seat adjustment mechanism for a motor vehicle comprising:

first and second stationary tracks defining a substantially horizontal plane;

first and second elongated carriages longitudinally movable on said first and second tracks, respectively;

first and second seat frame members adapted to be secured to the vehicle seat and being respectively coupled to said first and second carriages for longitudinal movement therewith;

a travelling seat belt buckle arrangement including:

a stationary riser member fixedly secured to said first track and the floor of the vehicle, said riser having a wall portion terminating in a first curled lip;

a slide bracket having a second curled lip formed on a first end thereof, said second curled lip positioned in an interlocked relationship with said first curled lip on said riser;

a reinforcement member having a first end rigidly secured to a second end of said slide bracket, and a first intermediate portion rigidly secured to said first carriage such that said slide bracket and said reinforcement member are longitudinally movable with said first carriage with respect to said riser and said first track;

a seat belt buckle anchor secured to at least one of said slide bracket and said first end of said reinforcement bracket for longitudinal movement therewith; and manually-operable horizontal adjustment means for selectively permitting synchronous longitudinal movement of said carriages on said tracks including:

pivotable lock arms supported for longitudinal movement with each of said first and second carriages, said lock arms pivotably movable between a locked position and a released position;

primary shear plates rigidly secured to said first and second tracks and having first locking means for inhibiting longitudinal movement of said first and second carriages, respectively when said lock arms are in said first position;

secondary shear plates supported for longitudinal movement with said first and second carriages and having second locking means adapted to cooperate with said first locking means for assisting in inhibiting longitudinal movement of said first and second carriages when said lock arms are in said first position; and biasing means for biasing said lock arms toward said first position, said manually-operable horizontal adjustment means adapted to transfer horizontally directed loads imparted on said seat belt buckle anchor to the floor of the vehicle through said primary and secondary shear plates and said riser member;

front vertical adjustment means for permitting vertical adjustment of a front portion of the vehicle seat with respect to a rear portion thereof including:

a first toothed quadrant and a first lift link each having a first end fixably secured adjacent to opposite ends of a first torsion bar, said first torsion bar being journalled for rotation to said first and second seat frame members; and means for pivotably coupling a second end of said first toothed quadrant to said first seat frame member and pivotably coupling a second end of said first lift link to said second seat frame member;

manually-operable means for permitting a seat occupant to activate said first vertical adjustment means including a first locking cam and a first toothed pawl, said first locking cam acting on said first toothed pawl for moving said first toothed pawl between a first position for engaging the teeth of said first toothed quadrant so as to lock said front portion of said seat frame members at a selected vertical position, and a second position disengaged from said teeth of said first toothed quadrant for permitting vertical adjustment of said front portion of said seat frame members; and second biasing means acts on said locking cam for biasing said first toothed pawl toward said first position; and second vertical adjustment means for permitting said seat occupant to vertically adjust said rear portion of the vehicle seat with respect to said front portion thereof including:

a second toothed quadrant pivotably supported from a rear portion of said first seat frame member;

a second torsion bar journalled for rotation to said first and second carriages;

a pair of laterally spaced transfer links each having a first end fixably secured to said second torsion bar and a second end pivotably mounted to respective ones of said first and second seat frame members, said transfer link mounted to said first seat frame member being pivotably coupled to said second toothed quadrant about a common pivot point;

third biasing means for normally biasing said second torsion bar and said transfer links to rotate in a direction such that said rear portion of said first and second seat frame members are biased toward an elevated vertical position;

said manually-operable means permitting said seat occupant to activate said second vertical adjustment means including a second locking cam and a second toothed pawl means, said second locking means acting on said second toothed pawl means for moving said second toothed pawl means between a third position for releasably engaging the teeth of said second toothed quadrant so as to lock said rear portion of said seat frame members at a selected vertical position, and a fourth position disengaged from said teeth of said second toothed quadrant for permitting vertical adjustment of said rear portion of said seat frame members.

* * * * *